United States Patent [19]
Zimmerman

[11] 3,877,037
[45] Apr. 8, 1975

[54] GRAPHICAL RECORDING INSTRUMENT

[75] Inventor: Hans Zimmerman, Schwenningen, Germany

[73] Assignee: Kienzle Apparate GmbH, Villingen/Black Forest, Germany

[22] Filed: Feb. 21, 1974

[21] Appl. No.: 444,385

[52] U.S. Cl.............. 346/44; 346/139 R; 346/145
[51] Int. Cl. .......................................... G01d 15/32
[58] Field of Search........ 346/137, 121, 123, 139 R, 346/18, 44, 139 C, 145

[56] References Cited
UNITED STATES PATENTS

| | | | |
|---|---|---|---|
| 2,006,882 | 7/1935 | Cleveland | 346/123 X |
| 2,500,657 | 3/1950 | Bowpitch | 346/139 C X |
| 3,761,948 | 9/1973 | Voegtlin et al. | 346/137 X |

*Primary Examiner*—Joseph W. Hartary
*Attorney, Agent, or Firm*—Michael S. Striker

[57] ABSTRACT

An instrument which graphically records the speed, operating times, periods of idleness and distances covered by a truck, van or another vehicle has a casing whose cover is pivotable between open and closed positions and is provided with a clockwork mechanism as well as with surfaces for supporting two identical diagram sheets in two parallel planes whereby the clockwork mechanism rotates the sheets. A plate-like carrier which is pivotable with respect to the cover and is normally located between the two planes supports a plate-like holder for a one-armed lever having a stylus or a like element serving to record information on one of the sheets. The holder further supports a two-armed lever which is coplanar with the one-armed lever and one arm of which is connected to the one-armed lever by a link. The other arm of the two-armed lever carries a pin which receives motion from a measuring mechanism in the casing when the cover is moved to its closed position. One side of the two-armed lever permanently overlies the holder so that the two-armed lever is less likely to be flexed and/or tilted during movement of the cover to its closed position and during resulting engagement of the motion receiving pin with the measuring mechanism. At least the one-armed lever consists, at least in part, of elastomeric material. The levers and the link are assembled with the holder before the latter is welded or riveted to the carrier.

8 Claims, 3 Drawing Figures

GRAPHICAL RECORDING INSTRUMENT

CROSS-REFERENCE TO RELATED INVENTION

The graphical recording instrument of the present invention constitutes an improvement over and a further development of the recording instrument which is disclosed in the commonly owned U.S. Pat. No. 3,761,948 granted Sep. 25, 1973 to Karl Voegtlin et al.

BACKGROUND OF THE INVENTION

The present invention relates to recording instruments in general, and more particularly to improvements in instruments for graphically recording or registering the speed, periods of idleness, periods of operation and/or other parameters of an automotive vehicle, such as a truck, the towing vehicle for one or more trailers, a van or the like. Still more particularly, the invention relates to improvements in recording instruments disclosed in U.S. Pat. No. 3,761,948 to Voegtlin et al.

The patent to Voegtlin et al. discloses a recording instrument wherein a clockwork mechanism which is installed in a pivotable portion or cover of the casing rotates two identical concentric diaphragm sheets. A carrier which is normally located between the parallel planes of the two sheets carries a first means for recording information on one of the sheets. A second means for recording information on the other sheet is mounted in the main portion of the casing, and the main portion further comprises a measuring means for transmitting motion to the first recording means. The carrier is a flat plate-like member which is pivotable with respect to the cover when the latter is moved to an open position whereby the person in charge is free to gain access to that diagram sheet which is located between the cover and the carrier. The other diagram sheet overlies the carrier and is accessible as soon as the cover is moved to its open position.

The invention which is disclosed in the patent to Voegtlin et al. solves the problem of simultaneously recording information on two concentric diagram sheets while affording access to each of the two sheets with little loss in time. As a rule, the first recording means which is supported by the carrier records on the one sheet the periods of operation of the vehicle and the recording means in the main portion of the casing records on the other sheet information pertaining to the speed of the vehicle, to the distances covered by the vehicle and/or others. The instrument of the patent to Voegtlin et al. overcomes the drawbacks of recording instruments disclosed in German Pat. No. 959,232 to Voegtlin, namely, that the information is recorded on the upper sides of both sheets rather than on the upper side of one sheet and on the underside of the other sheet as proposed in the German patent.

In the recording instrument of the U.S. Pat. No. 3,761,948 to Voegtlin et al., the first recording means is mounted practically entirely within the confines of the carrier; only the tip of the recording element extends beyond one side of the carrier so as to contact the one diagram sheet when the carrier is moved to its operative position. In such operative position, the carrier can serve as a support for the other sheet and, at the same time, as a cover or shroud for the one sheet. The tip of the recording element forming part of the recording means on the carrier moves at right angles to the one sheet while the carrier approaches or leaves its operative position. Also, the construction disclosed in U.S. Pat. No. 3,761,948 renders it possible to employ diagram sheets which are only slightly smaller than the casing.

It has been found that the recordings made on the one diagram sheet by recording means which is supported by the carrier are not sufficiently reliable, especially if the first recording means is mounted in a manner as shown in FIGS. 1-3 and 6-7 of the U.S. Pat. No. 3,761,948. This is due to the fact that, owing to the thinness of the carrier, the means for pivotably supporting the first recording means is rather short and the first recording means can be tilted through a relatively large angle. The inaccuracies are compounded if the first recording means is mechanically coupled to the motion transmitting device in the main portion of the casing in response to closing of the cover, especially if the cover is closed abruptly by slamming it against the main casing portion. This can result in damage to the first recording means. Moreover, the position of the coupling between the first recording means in the carrier and the corresponding motion transmitting means in the casing cannot be selected at will because the motion receiving arm of the first recording means is rather short.

SUMMARY OF THE INVENTION

An object of the invention is to provide a graphical recording instrument wherein the recording means on the carrier is less likely to be damaged during movement of the carrier to its operative position and/or during closing of the cover.

Another object of the invention is to provide a recording instrument wherein the motion transmitting connection between the recording means on the carrier and the output element or elements of measuring means in the casing is simpler, more rugged, more relieable and longer-lasting than in heretofore known instruments.

A further object of the invention is to provide a recording instrument which affords greater freedom for selection of the position of motion transmitting means between the output element or elements of the measuring means in the casing and the recording means on the carrier.

An additional object of the invention is to provide a recording instrument wherein the just enumerated advantages can be achieved without unduly increasing the dimensions and/or adding to the complexity of the instrument.

A further object of the invention is to provide a recording instrument with novel and improved recording means and with novel and improved means for moving the recording means relative to a diagram sheet.

The invention is embodied in an instrument for graphically recording the speed, operating times, periods of idleness, the distances covered and/or other parameters of trucks, vans or other types of automotive vehicles. The instrument comprises a casing having a portion (e.g., a substantially circular cover) movable between open and closed positions and having rotary means (e.g., a clockwork mechanism) for supporting identical first and second diagram sheets in two parallel planes, a preferably plate-like carrier which is movable with respect to the cover and is normally located between the two planes, recording means movably supported by the carrier and having a stylus or an analogous element which is arranged to record information on one of the two diagram sheets, and motion transmitting means movably supported by the carrier and being operable (e.g., by a measuring mechanism in the main portion of the casing) to move the recording means relative to the carrier and the one sheet.

In accordance with a presently preferred embodiment of the invention, the recording means comprises a first lever pivotably mounted on a plate-like holder which is welded, riveted or otherwise secured to the carrier, and the motion transmitting means comprises a second lever which is coplanar with the first lever and is pivotably mounted on the aforementioned holder. The motion transmitting means further comprises a link which is articulately connected with the two levers. The second lever has a pin or analogous motion receiving means which is connected to the aforementioned measuring mechanism when the cover is mounted to its closed position.

At least the major portion of one side of the second lever preferably overlies the holder so that the second lever is held against excessive flexing or tilting in response to engagement of motion receiving means with the measuring mechanism.

The novel features which are considered as characteristic of the invention are set forth in particular in the appended claims. The improved recording instrument itself, however, both as to its construction and its mode of operation, together with additional features and advantages thereof, will be beat understood upon perusal of the following detailed description of certain specific embodiments with reference to the accompanying drawing.

DESCRIPTION OF THE PREFERRED EMBODIMENTS

Figure 1:
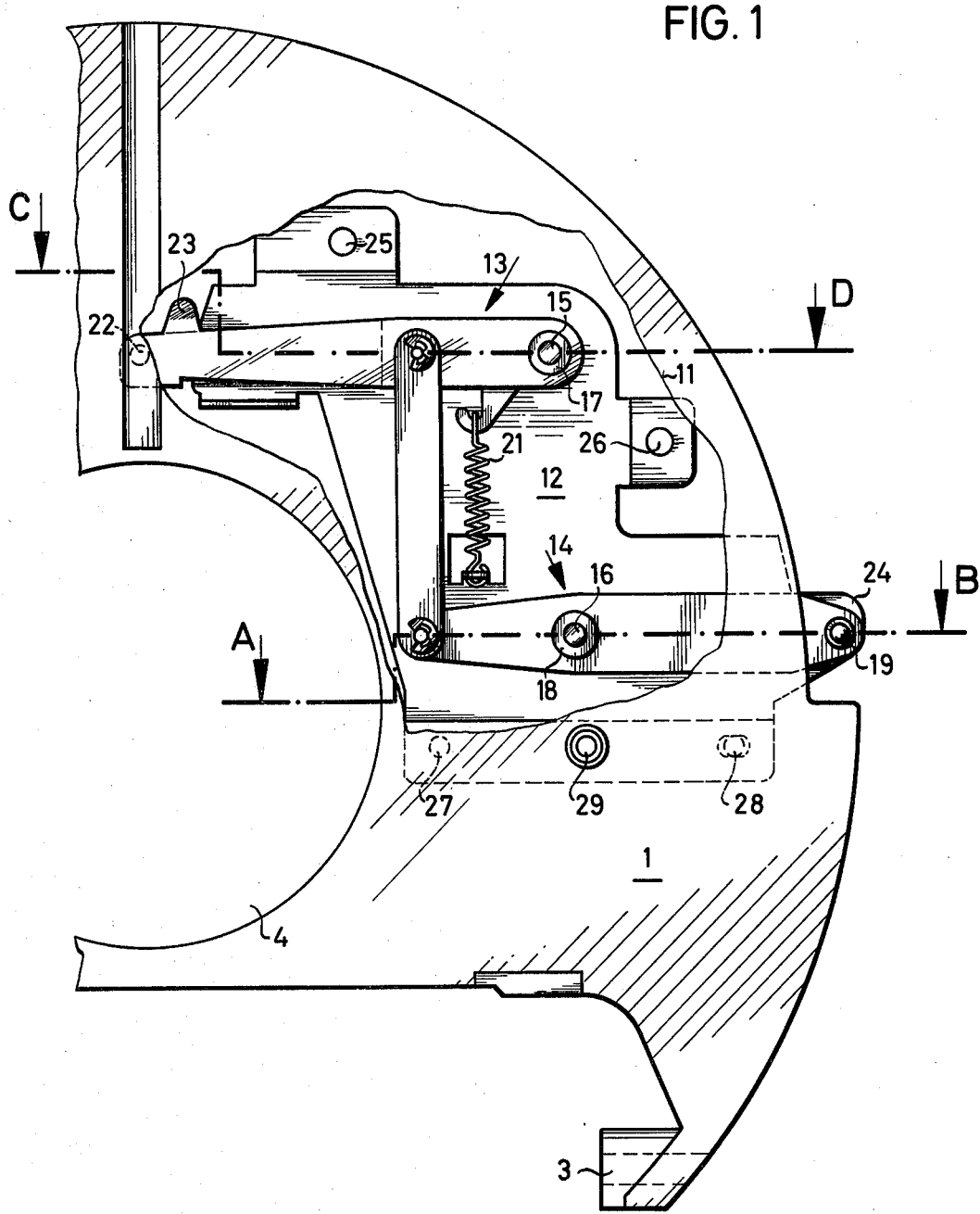
FIG. 1 is a fragmentary plan view of a carrier which embodies the invention, with the casing of the recording instrument omitted.

The drawing illustrates a portion of a graphical recording instrument including a casing or housing having a movable portion or cover 2 pivotable between open and closed positions and pivotally supporting a plate-like carrier 1. The cover 2 corresponds to the cover 3 of the recording instrument disclosed in U.S. Pat. No. 3,761,948 and is pivotable with respect to the main portion (not shown) of the casing. One of the hinges for the carrier 1 is shown in FIG. 1, as at 3. A substantially centrally located aperture or cutout 4 of the carrier 1 serves to receive a centering post 6 which is smounted on the cover 2 and passes through the central openings of two identical diagram sheets 9 and 10. The reference character 5 denotes a rotary portion of a clockwork mechanism in the cover 2. The top surface of the portion 5 rotates the sheet 9 which is biased thereagainst by a clamping member 7. A second clamping member 8 can bias the sheet 10 against the upper surface of the clamping member 7 so that the sheets 9, 10 rotate with the portion 5. The plane of the sheet 9 is parallel to the plane of the sheet 10, and the carrier 1 is normally located in the space between such planes. The pivot axis (see the hinge 3) for the carrier 1 is parallel to the planes of the sheets 9 and 10.

Figure 3:
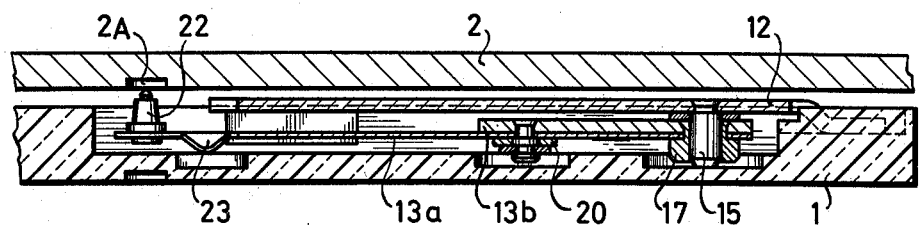
FIG. 3 is a sectional view as seen in the direction of arrows from the line C–D of FIG. 1, further showing a portion of the cover.

A portion of the carrier 1 is broken away in FIG. 1, as at 11, to reveal a plate-like holder 12 which is disposed between the carrier and the sheet 9. The carrier 1 is located between the holder 12 and the sheet 10. The recording means for the sheet 9 comprises a one-armed lever 13 which is pivotable on the holder 12 and carries a recording element 22 which, in the absence of a sheet 9, can extend into a recess 2A (see FIG. 3) of the cover 2. The holder 12 is affixed to the carrier 1 and further supports means for transmitting motion from a measuring device in the main portion of the casing (see the part 47 in FIG. 8 of U.S. Pat. No. 3,761,948) to the one-armed lever 13. The motion transmitting means comprises a two-armed lever 14 which is pivotable about the axis of a pin 16 secured to the holder 12 and a link 20 which is articulately coupled to the levers 13 and 14. The lever 13 is pivotable on a pin 15 of the holder 12, and the pins 15, 16 are respectively surrounded by sleeves 17, 18 which reduce the likelihood of excessive tilting of levers 13, 14 on the respective pivot pins.

The longer or outer arm of the motion transmitting lever 14 is pivotable by a pin 19 which receives motion from measuring means in the main portion of the casing. When the pin 19 pivots the lever 14 clockwise, as viewed in FIG. 1, the link 20 pivots the lever 13 clockwise whereby the recording element 22 moves radially of the rotating sheet 9. A helical spring 21 reacts against the holder 12 or carrier 10 and biases the lever 13 to a starting position which the lever 13 assumes as soon as the pin 19 is disengaged from measuring means in the main portion of the casing, i.e., when the cover 2 is pivoted to its open position.

In accordance with a feature of the invention, the lever 13 comprises a relatively rigid portion 13*b* which is pivotable about the axis of the pin 15 and a relatively thin elastic portion 13*a* which carries the recording element 22. The elastic portion 13*a* has a projection 23 (e.g., a part which is bent out of the general plane of the portion 13*a*) which abuts against the adjacent side of the carrier 1 and thereby insures that the element 22 bears against the sheet 9.

The motion transmitting lever 14 is held against flexing at right angles to the plane of FIG. 1 by a stop or back support 24 of the holder 12; such flexing could take place when the cover 2 is being moved to closed position and the motion receiving pin 19 engages with the measuring means in the main portion of the casing. The back support 24 is adjacent to the pin 19.

The holder 12 can be assembled with the parts 13–21 prior to attachment to the carrier 1. The means for securing the holder 12 to the carrier 1 comprises a plurality of pins 25, 26, 27, 28, 29 which can be riveted welded or soldered to the parts 1, 12. The pins 25–29 can be provided on the carrier 1 and enter complementary openings in the holder 12 during assembly of the recording instrument. These pins and the complementary openings serve as a means for locating the holder 12 in a predetermined optimum position with respect to the carrier 1.

The lever 13 is coplanar with the lever 14.

An important advantage of the improved recording instrument is that the lever 13 of recording means on the carrier 1 can be mounted in the plane of motion transmitting lever 14 and in the simplicity of means (link 20) for moving the recording element 22 relative to the sheet 9 in response to pivoting of the lever 14 through the medium of the pin 19. The holder 12 constitutes an optional but highly advantageous part of the instrument because it allows for a complete assembly of parts 13-21 prior to attachment of parts 13-21 to the carrier 1.

It has been found that, even though the improved instrument comprises a larger number of parts than the instrument of U.S. Pat. No. 3,761,948, the recording means on the carrier 1 is less likely to be damaged or deformed during movement of the carrier 1 to its operative position and/or during movement of the cover 2 to its closed position. Moreover, the provision of motion transmitting means 14, 20 on the carrier 1 renders it possible to select the position of the pin 19 at will and allows for greater freedom in selection of the initial position of the recording element 22. The shocks to which the lever 13 is subjected during movement of the carrier 1 relative to the cover 2 and/or during movement of the cover 2 relative to the main portion of the casing can be reduced still further if at least a portion of the motion transmitting lever 14 and/or link 20 consists of an elastomeric material. For example, the entire lever 14 may consist of a material which is elastically deformable within certain limits.

The fact that the carrier 1 supports a relatively large number of parts is more than compensated for by the possiblity of assembling the parts 12-21 into a prefabricated unit before the holder 12 is secured to the carrier 1. This renders it possible to assemble the parts with a high degree of accuracy and to check the tolerancess prior to attachment of the holder 12 to carrier 1. The provision of the back support 24 renders it possible to support the entire lever 14 against undue flexing or tilting with respect to the holder 12 while the cover 1 is being moved to its closed position. This is important because such mounting reduces the likelihood of intentional interruption of recordings on the sheet 9, for example, by a driver who wishes to operate the vehicle for an unauthorized trip.

The length of the one and/or other arm of the lever 14 can be selected within a wide range. This also contributes to greater freedom in selection of the position of measuring means which drives the lever 13 through the medium of the lever 14 and link 20. Moreover, the arm or arms of the lever 14 can be made sufficiently short to insure a satisfactory rigidity and a reduction of stresses upon the pivot means 16, 18 and/or the articulate connection between the lever 14 and link 20.

Figure 2:
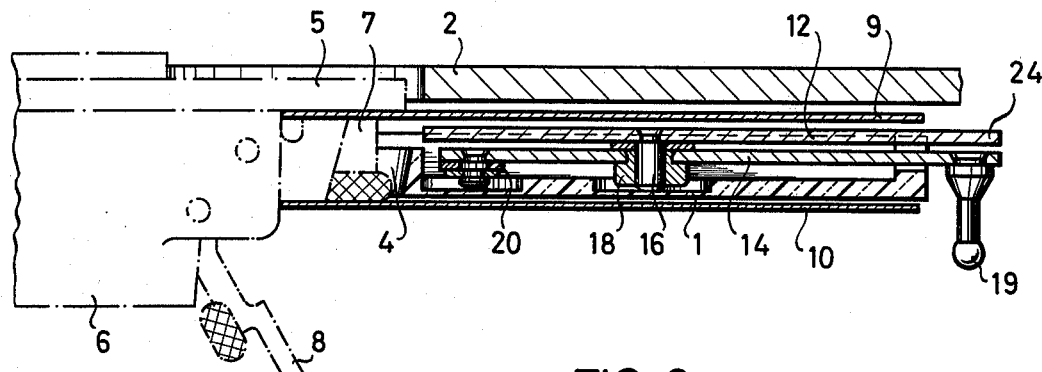
FIG. 2 is a sectional view as seen in the direction of arrows from the line A–B of FIG. 1, furhter showing the cover of the casing, the two diagram sheets and certain other parts of the recording instrument.

The means for recording information on the sheet 10 of FIG. 2 can be constructed and operated in a manner as disclosed in U.S. Pat. No. 3,761,948.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In an instrument for recording the speed, operating times, periods of idleness, the distances covered and/or other parameters of automotive vehicles, a combination comprising a casing having a portion movable between open and closed positions and having rotary means for supporting first and second diagram sheets in two parallel planes; a carrier movable with respect to said portion of said casing and normally located between said planes; a plate-like holder extending substantially parallel to said carrier between said planes and being fixed in spaced relationship to said carrier; recording means movably supported by said holder in the space between the latter and said carrier and having a recording element projecting in one direction beyond said holder to record information on a diagram sheet in one of said planes; and motion transmitting means movably supported by said holder in said space and having a motion receiving portion projecting in a direction opposite to said one direction beyond said carrier and operable for moving said recording means relative to said carrier.

2. A combination as defined in claim 1, wherein said recording means comprises a first lever pivotable relative to said carrier and said motion transmitting means comprises a second lever pivotable relative to said carrier and a link connecting said levers.

3. A combination as defined in claim 2, wherein said first lever is substantially coplanar with said second lever.

4. A combination as defined in claim 1, wherein said motion transmitting means comprises a lever which is pivotable on said holder and carrying said motion receiving portion, said holder including a back support adjacent to said motion receiving portion and arranged to prevent flexing and/or tilting of said lever in response to transmission of stresses to said motion receiving portion.

5. A combination as defined in claim 4, wherein said lever has a first side and a second side and at least the major portion of one of said sides permanently overlies said holder.

6. A combination as defined in claim 1, wherein said recording means comprises a one-armed lever, pivot means securing one end of said lever to said holder and said recording element being located at the other end of said lever, said lever having a rigid first portion which is secured to said pivot means and an elastomeric second portion supporting said recording element.

7. A combination as defined in claim 1, wherein said motion transmitting means comprises a lever having first and second arms, a link articulately connecting one of said arms to said recording means, said motion receiving portion being provided on the other arm of said lever.

8. A combination as defined in claim 1, wherein said portion of said casing is pivotable between said open and closed positions and further comprising means for pivotably securing said carrier to said portion of said casing, the pivot axis of said carrier being parallel to said planes.

* * * * *